(12) United States Patent  
Ng

(10) Patent No.: US 9,062,889 B2  
(45) Date of Patent: Jun. 23, 2015

(54) TEMPERATURE BASED LOCATION DETERMINATION SYSTEM AND METHOD

(75) Inventor: Hock M. Ng, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 604 days.

(21) Appl. No.: 13/426,870

(22) Filed: Mar. 22, 2012

(65) Prior Publication Data

US 2013/0253877 A1 Sep. 26, 2013

(51) Int. Cl.
*F24F 11/00* (2006.01)
*G01C 21/20* (2006.01)

(52) U.S. Cl.
CPC .......... *F24F 11/0012* (2013.01); *G01C 21/206* (2013.01); *F24F 2011/0035* (2013.01); *F24F 11/0034* (2013.01)

(58) Field of Classification Search
CPC ..................................................... F24F 11/0012
USPC .......................................................... 702/131
See application file for complete search history.

(56) References Cited

U.S. PATENT DOCUMENTS 5,691,921 A * 11/1997 Berlin ............................. 702/99
2010/0308894 A1* 12/2010 Koyama ....................... 327/517
2012/0320943 A1* 12/2012 Cramer et al. ................ 374/102

\* cited by examiner

*Primary Examiner* — Bryan Bui
(74) *Attorney, Agent, or Firm* — Carlson, Gaskey & Olds, P.C.

(57) ABSTRACT

An exemplary method of determining location information includes sensing a temperature of an object or person in a sensing field of at least one temperature sensor at each of a plurality of measurement periods. A relationship between the sensed temperature at a first one of the measurement periods and the sensed temperature at a second, later one of the measurement periods is determined. A determination is made from the determined relationship whether the object or person moved relative to the temperature sensor during a time from the first one of the measurement periods to the second one of the measurement periods.

20 Claims, 6 Drawing Sheets

TEMPERATURE BASED LOCATION DETERMINATION SYSTEM AND METHOD

BACKGROUND

There are a variety of situations in which it is desirable or necessary to determine or track the position of an individual or object. There are a variety of approaches that have been proposed or implemented to provide information regarding a position of a person or object.

Most systems utilize tags that are secured to an object of interest or carried or worn by an individual. The tag may communicate with monitoring equipment using Wireless Fidelity (Wi-Fi), infrared, ultrasonic or other radio frequency communication techniques. One drawback associated with such systems is that they might require cooperation from those who will be monitored. An individual typically has to have a tag or else that individual cannot be located or tracked. Similarly, an object typically has to have a tag attached or information regarding its position might not be available.

Another drawback is that such systems might provide limited accuracy. Typically location information is only as certain as an indication of presence within a room. There typically is very limited or no ability to tell with any certainty where the person or object is inside that room.

Other location systems use video information to determine the location or movement of an individual. While such systems can provide better accuracy and do not require cooperation, they present other challenges. One drawback of video-based systems is that individuals who have to be monitored may have less privacy or otherwise may feel uncomfortable. Another limitation of video-based systems is that they require adequate lighting for any information to be available.

SUMMARY

An exemplary method of determining location information includes sensing a temperature of an object or person in a sensing field of at least one temperature sensor at each of a plurality of measurement periods. A relationship between the sensed temperature at a first one of the measurement periods and the sensed temperature at a second, later one of the measurement periods is determined. A determination is made from the determined relationship whether the object or person moved relative to the temperature sensor during the time from the first one of the measurement periods to the second one of the measurement periods.

An exemplary system for determining location information includes at least one temperature sensor situated to sense a temperature of an object or person in a sensing field of the sensor. The sensor provides an indication of a sensed temperature at each of a plurality of measurement periods. A processor is configured to receive sensed temperature indications from the temperature sensor. The processor determines a relationship between the sensed temperature at a first one of the measurement periods and the sensed temperature at a second, later one of the measurement periods. The processor is also configured to determine, from the determined relationship, whether the object or person moved relative to the temperature sensor during a time from the first one of the measurement periods to the second one of the measurement periods.

The various features and advantages of a disclosed example embodiment will become apparent to those skilled in the art from the following detailed description. The drawings that accompany the detailed description can be briefly described as follows.

DETAILED DESCRIPTION

Figure 1:
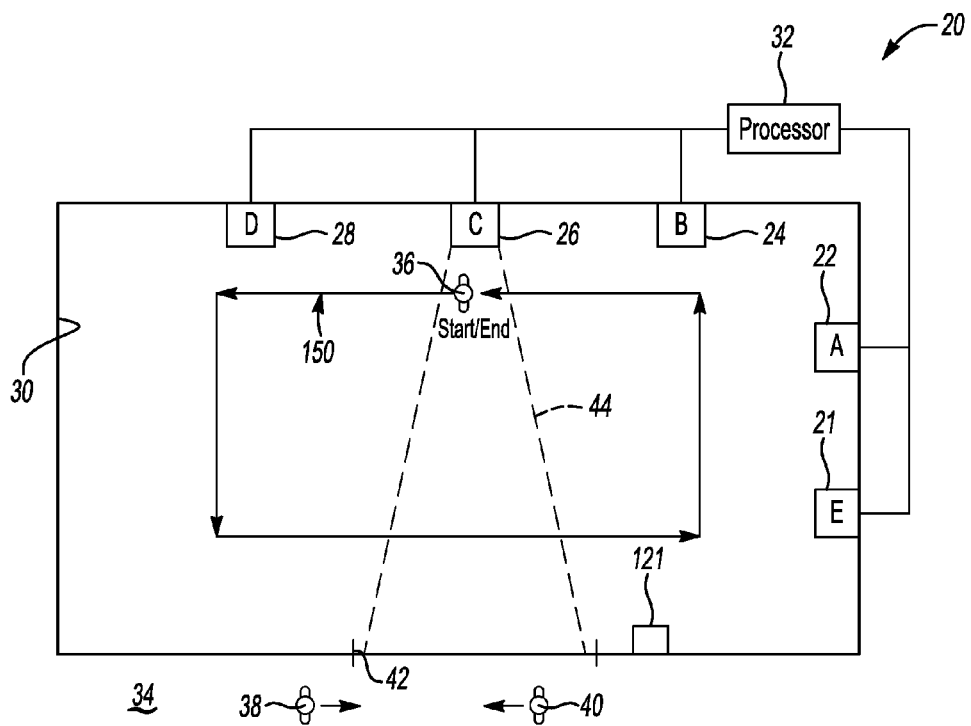
FIG. 1 schematically illustrates an example arrangement of a system for providing location information regarding at least one individual or object.

FIG. 1 schematically illustrates selected portions of an exemplary system 20 for determining location information regarding objects or people. The system 20 includes a plurality of temperature sensors 21, 22, 24, 26, 28 situated within an area 30 such as a room. The temperature sensors 21-28 in one example comprise thermopile elements that detect temperatures in a known manner. In the illustrated example, the sensors are situated on walls at a height of about 1 meter. That height is useful to sense individuals because it corresponds to a midsection of a typical person's body from which a significant amount of body heat is radiated.

The temperature sensors 21-28 each communicate with a processor 32 using wireless or hard-wired communication links. The processor 32 is configured to use indications of temperatures sensed by the sensors to determine location or movement information regarding an object or individual in the area 30 or an adjacent area 34. For example, the processor 32 may provide location or movement information regarding any of a plurality of individuals 36, 38 and 40 that may move about within the areas 30 and 34. In one example, the area 30 is a room and the adjacent area 34 is a hallway outside of the room.

In the illustrated example, at least the sensor 26 is situated so that a passage or doorway 42 is within a field of sensing 44 of the sensor 26. The sensor 26 in this example provides information to the processor 32 whenever an individual is within the sensing field 44 regardless of whether that individual is within the room 30 or in the hall 34. The processor 32 is configured to use such information to determine whenever an individual such as one of the people 38 or 40 pass by the doorway 42, linger in the hall 34 or room 30 near the doorway 42 or enter the room 30. Once in the room 30, the temperature sensor 26 may provide information regarding an individual that is within the sensing field 44. The other sensors 21, 22, 24 and 28 each provide information regarding in individual in their respective sensing fields. In the illustrated example, the sensors 21, 22, 24 and 28 only provide information regarding an individual or object that is in the room 30 because of their respective positions and orientations.

Figure 2:
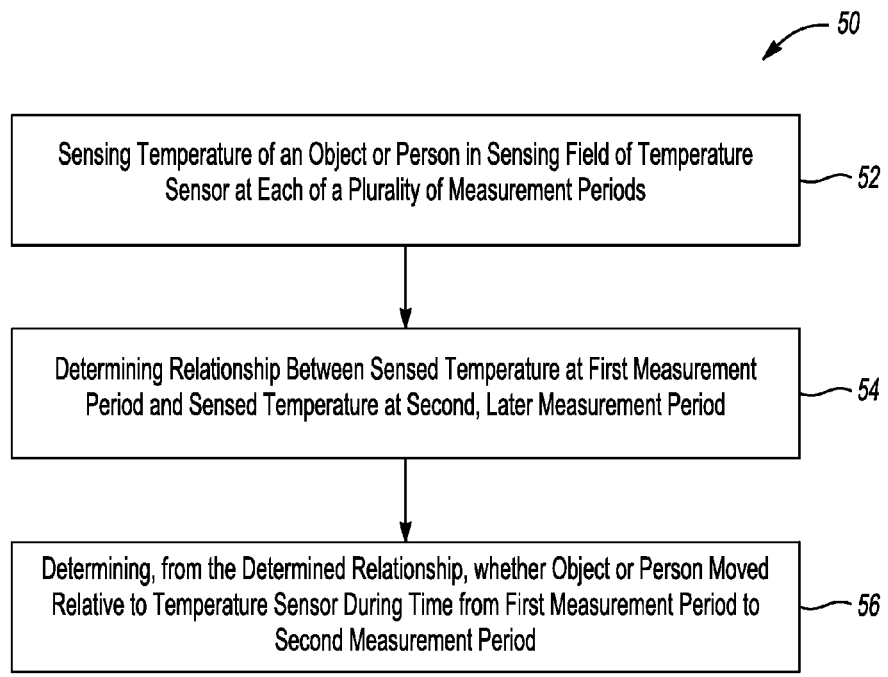
FIG. 2 is a flowchart diagram summarizing an example location strategy.

FIG. 2 summarizes an example approach of using temperature information from any of the temperature sensors for determining location or movement information. The illustrated flowchart 50 includes sensing the temperature of an object or person at 52. The object or person has to be within a sensing field of a sensor to provide an indication of a sensed temperature to the processor 32. Each sensor in the illustrated example (FIG. 1) provides an indication of sensed temperature for each of a plurality of measurement periods. For example, each sensor provides an indication of sensed temperature at least once per second. In some examples, the measurement periods are less than a second and the temperature sensors provide a sensed temperature output to the processor 32 more than once per second.

At 54 the processor 32 determines a relationship between the sensed temperature at a first measurement period and the sensed temperature at a second, later measurement period. The relationship between the sensed temperatures provides an indication of any movement of the detected person or object during the time that includes the measurement periods. At 56 the processor 32 uses the determined relationship at 54 for determining whether the object or person moved relative to the sensor during the time from the first measurement period to the second measurement period. In some examples, the first and second measurement periods are immediately adjacent to each other in time. In other examples, the first and second measurement periods are separated by several intervening measurement periods.

The relationship used for determining whether the object or individual moved in this example is based on relative magnitudes of the temperatures at the first and second measurement periods. The sensed temperatures provide an indication of distance between the sensed object or individual and the temperature sensor. For example, if an individual is essentially stationary relative to a temperature sensor between the measurement periods then the corresponding sensed temperatures will be approximately the same. If the individual is moving closer toward the temperature sensor during that time the sensed temperature at the second measurement period will be greater than the sensed temperature at the first measurement period. If the sensed temperature is lower at the second measurement period that corresponds to the individual moving away from the sensor. The processor uses the relationship between the temperatures to determine the distance between the sensed object or individual and the sensor.

In one example, the processor 32 uses a predetermined relationship between sensed temperature and distance to determine an approximate actual distance of the sensed object or individual from the temperature sensor. For example, individuals typically radiate heat at an approximately constant rate resulting in an approximately constant detectable temperature. The way in which radiated body heat dissipates as it moves further out from the body results in a higher detected or sensed temperature when an individual is near a sensor compared to when that individual is further from the sensor.

Figure 3:
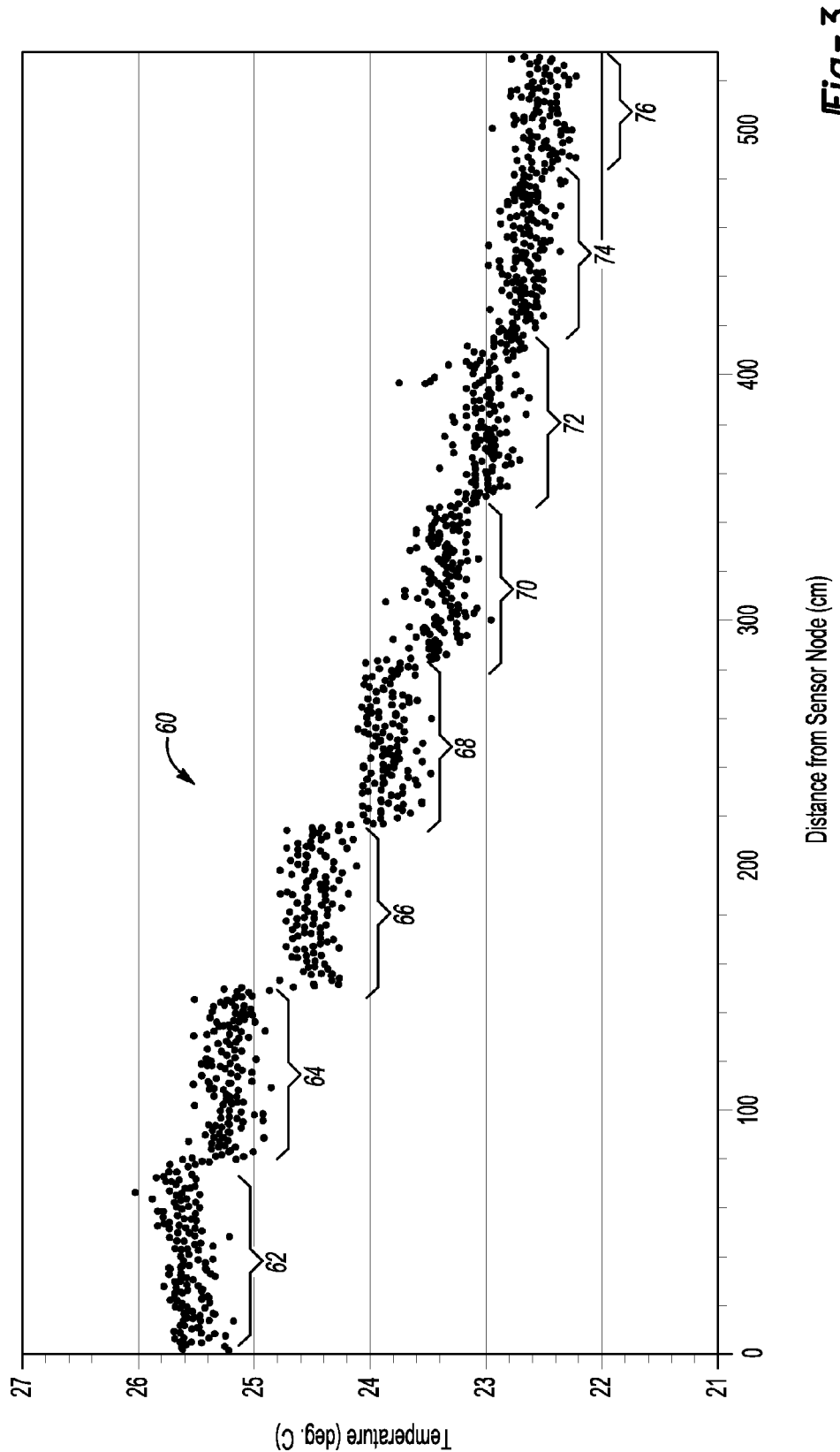
FIG. 3 schematically illustrates part of an example technique for establishing a relationship between temperature and distance from a temperature sensor.

FIG. 3 illustrates part of an example process for establishing a relationship between temperature and distance. A plot 60 illustrates a plurality of sensed temperatures from a single one of the temperature sensors 21-28. The sensed temperatures at 62 correspond to an individual at a fixed, known distance from the sensor. The sensed temperatures at 64 correspond to the individual at a second, further fixed, known distance from the sensor. Each of the sets of temperatures at 66, 68, 70, 72, 74 and 76 correspond to respective further known distances between the individual and the sensor. In one example, the individual moves in one foot or thirty centimeter increments for each set of temperature measurements. As indicated in FIG. 3, as the distance between an individual and a sensor increases, the sensed temperature decreases.

Figure 4:
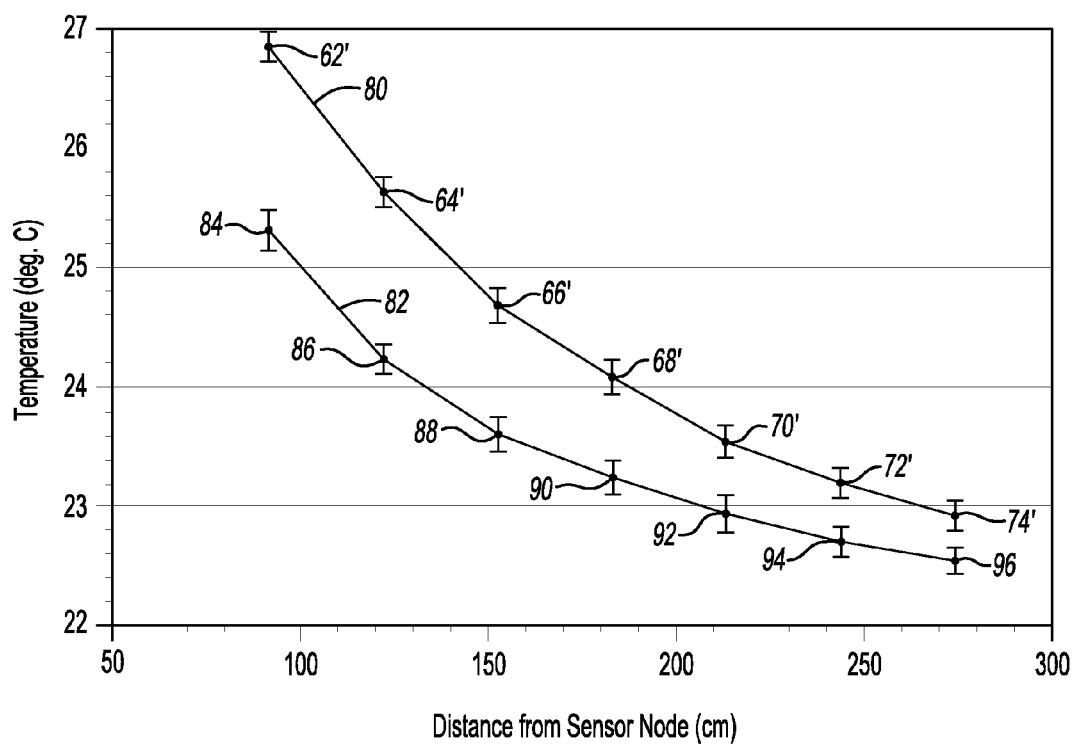
FIG. 4 schematically illustrates two relationships between temperature and distance.

FIG. 4 shows average sensed temperatures 62' through 74' that correspond to averages of the sets of sensed temperatures shown in FIG. 3. This example includes determining the relationship between distance and sensed temperature by using a fitting function for determining a curve 80 that includes the average temperatures 62' through 74'. The function or curve 80 serves as a predetermined relationship between distance and measured temperature that allows the processor 32 to determine the distance between a temperature sensor and an object or individual that enters the sensing field of that sensor during a monitoring procedure.

Determining the relationship between distance and temperature in one example is based upon the Stefan-Boltzmann law, which provides a relationship between the total radiation power of an object, the radiating surface area of that object and its temperature. The output voltage of a thermopile temperature sensor is related to the amount of thermal radiation impinging upon the sensing element. There are known equations that describe the relationship between the voltage output of a thermopile sensor, the radiation power impinging upon that sensor and the sensed temperature of the source of that radiation. For most position determining procedures, it is a reasonable assumption that the temperature and area of the object being sensed are constants. This allows for using detected temperature to obtain an indication of the distance between the person or object and the sensor. As the distance between the object and the sensor varies, the effective radiating area observed by the sensor changes. In the case of measuring the proximity of an individual to the sensor, the measured temperature decreases or increases depending on whether the person is moving away from or closer to the sensor, respectively.

After empirically gathering data as schematically shown in FIG. 3 and determining the average values shown in FIG. 4 at 62'-74', it is possible to determine a second order polynomial to fit to the data points. One example takes advantage of the known way in which the view factor of a sensor depends on distance. For example, it is known that the flux transfer from one surface to another depends on the relative angle of the two surfaces. The distance between those surfaces affects the flux transfer such that the flux transfer depends on the inverse distance squared. This leads to using a rational function as a fitting function for the distance data in FIGS. 3 and 4. One example uses a fitting function $y=a+b/(c+(x^2))$ in which y corresponds to the temperature and x corresponds to the distance. The values for a, b and c are the fitting function values that establish the curve 80 in FIG. 4. Given this description and known fitting function techniques, those skilled in the art will be able to obtain a fitting function to express the predetermined relationship between distance and sensed temperature that meets their particular needs.

Once the fitting function has been determined, a relationship between detected temperature and distance from a sensor for an object of approximately the same radiating power can be used for locating or tracking an object or individual.

The example of FIG. 4 includes another relationship described by a curve 82. This example takes into account that an individual may have various postures or poses relative to a sensor that can affect the amount of radiation impinging on that sensor. For example, when an individual is directly facing a sensor, the width of that individual's body provides a surface area from which heat or radiating power moves toward the sensor. If that same individual were turned sideways relative to the sensor (e.g., so that the individual's shoulder is pointing toward the sensor), that decreases the amount of surface area radiating toward the sensor. The detected temperature between those two different poses or postures may vary. The example of FIG. 4 accounts for such variation by establishing two different relationships 80 and 82. In this example, the relationship 80 corresponds to empirically gathered data with an individual directly facing a sensor while the relationship 82 corresponds to empirically gathered data with the individual standing sideways relative to the sensor. Empirical data like that shown in FIG. 3 is gathered for each posture or pose. In the example of FIG. 4, average data points 84, 86, 88, 90, 92, 94 and 96 correspond to the detected temperatures at the same distance where the average data points 62'-74', respectively, were obtained. One example includes using the range of temperatures between the curves 82 and 80 for estimating an approximate distance between an individual and a sensor given that there may be no information available to the processor 32 regarding the posture or orientation of that individual relative to the sensor.

Another feature of FIG. 4 is that it allows for establishing a granularity or certainty regarding determined distances based upon detecting an individual. The variation between the curves 80 and 82 shows a possible variation in the detected temperature for a given distance depending on the orientation of an individual relative to the sensor. The information regarding the curves 80 and 82 may be used for establishing a level of certainty or accuracy for a particular distance determination. In one example, the processor 32 makes a distance determination based on each of the relationships 80 and 82 shown in FIG. 4 and then determines an average distance between the two as the distance at which the individual is presumed to be from the sensor. For example, if a detected temperature is 25° C., the relationship 82 indicates a distance of approximately 100 centimeters while the relationship 80 indicates a distance of approximately 140 centimeters. In one such example, the processor would make the determination that the individual is approximately 120 centimeters from the temperature sensor.

Figure 5:
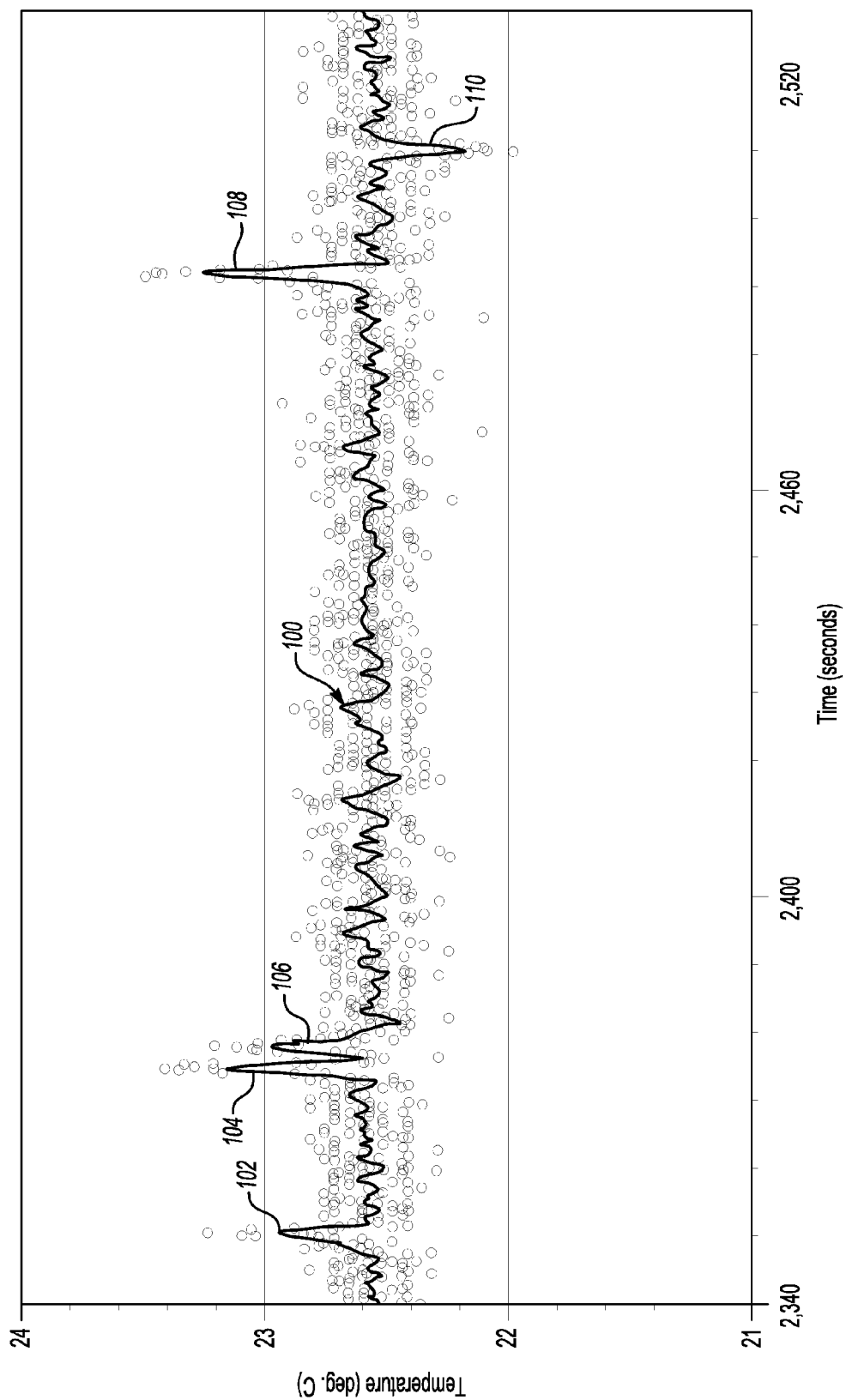
FIG. 5 schematically illustrates example location and movement information available from an embodiment of this invention.

The illustrated example allows for using the temperature information from a temperature sensor directly for determining position information regarding a detected object or individual. A variety of location and tracking capabilities are available using the illustrated example. FIG. 5 includes a plot 100 of the output of the example sensor 26. During most of the time shown in FIG. 5, the sensor 26 provides an output that corresponds to the ambient temperature within the sensing field 44. As shown at 102, 104, 106 and 108, an individual passes through the sensing field 44 resulting in a temporary increase in the detected temperature. The magnitudes of the peaks at 102 and 106 are lower than the magnitudes at 104 and 108 in this example. That is considered an indication that the individuals detected at 102 and 106 are at a further distance from the sensor 26 compared to the individuals that were detected at 104 and 108. Each of the detections at 102-108 provides an indication of an individual passing through the sensing field 44, which may indicate, for example, individuals passing across the doorway 42. The illustrated example, therefore, provides the ability for traffic monitoring or counting how many individuals pass by a doorway or another area of interest.

In FIG. 5, another detecting event is shown at 110. In this example, the temperature at 110 is a decrease from the ambient temperature normally detected by the sensor 26. The decrease at 110 may indicate that an individual passed through the sensing field who just came from the outside where the temperature is much lower than the ambient temperature within the sensing field 44. The decrease in temperature at 110 may also indicate the opening of a door that provides access to the outside during winter months, for example. This provides additional ability for monitoring traffic. For example, it may be possible to monitor times when individuals are entering or leaving a building for a variety of purposes.

The events represented by the temperature sensor output in FIG. 5 correspond to an individual walking across the sensing field 44 from right-to-left, for example, in FIG. 1. The change in temperature output from the sensor 26 rises beginning when the individual enters the sensing field 44, reaches the peak when the individual is in approximately the center of the sensing field and then decreases as the individual continues through and eventually leaves the sensing field 44. Given the manner in which thermopile sensors work, the individual is detected as closest to the sensor when it is directly in line with the sensor at approximately the center of the sensing field.

One example includes using Wien's displacement law for selecting the sensitivity of the sensors. One example includes a spectral sensitivity window of 6 to 15 micrometers for each temperature sensor. This is because the wavelength of detected body heat is typically between 9 and 15 microns. A peak sensitivity of approximately 9.5 microns is suitable for some such sensors when detecting individuals.

Figure 6:
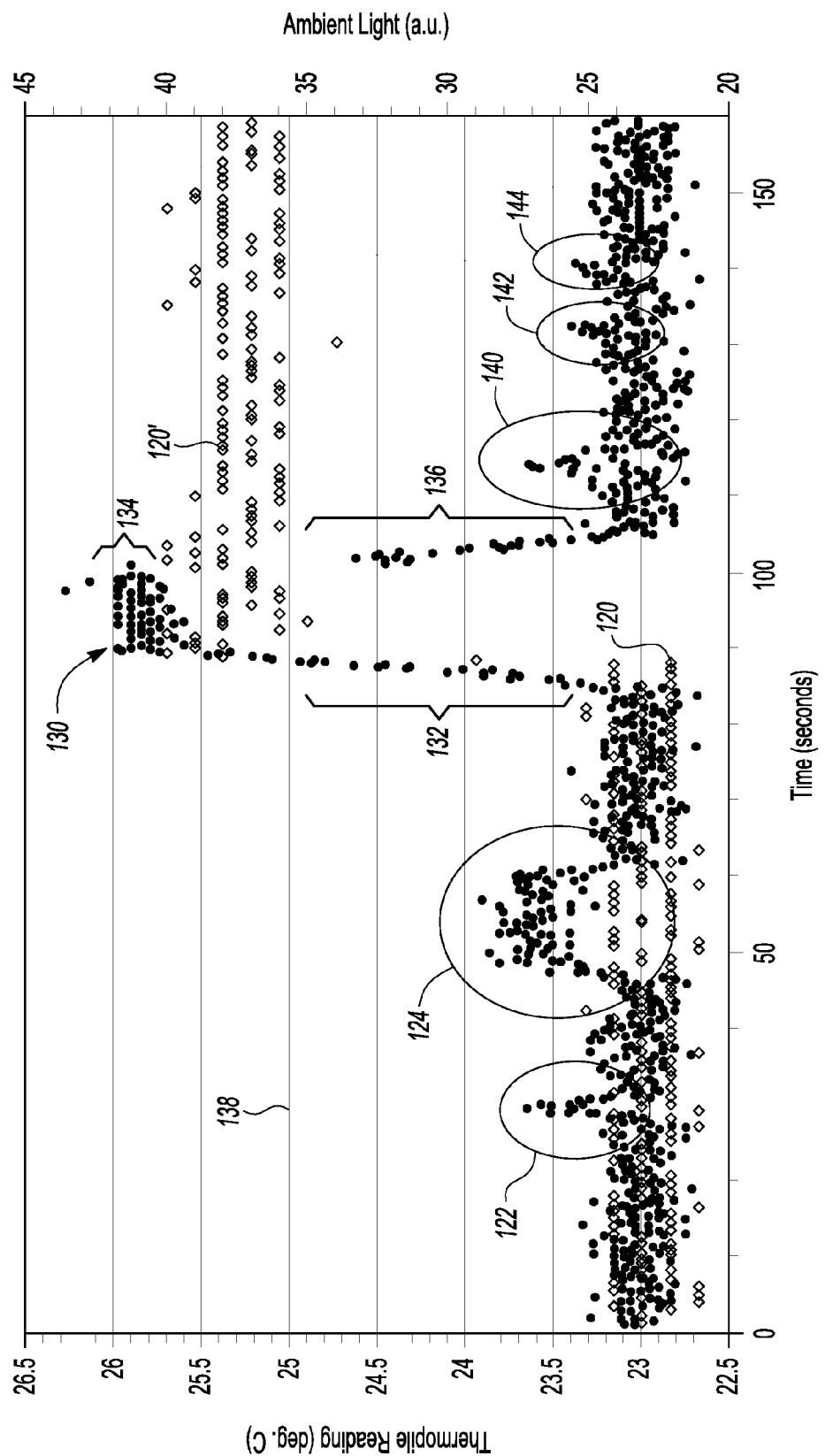
FIG. 6 schematically illustrates example location and movement information available from an embodiment of this invention.

FIG. 6 illustrates, for example, how temperature information from the sensors 21-28 provides further information regarding detected individuals or objects. In this example, the temperature sensor information is combined with another type of sensor output schematically shown at 120. In the example of FIG. 1, an additional sensor 121 is situated within the area 30. In one example, the sensor 121 is a motion detector. In another example, the sensor 121 is a light detector that is responsive to ambient light conditions. In FIG. 6, the sensor output at 120 corresponds to the lights within the area 30 being turned off. As shown at 122, the sensor 26 provides an output indicating that an individual has passed by the doorway 42 within the hallway 34. At 124, another individual is detected in the doorway 42. The width (i.e., from right-to-left) of the peak shown at 124 is greater than that shown at 122. The greater width at 124 indicates that the individual detected at that point either lingered in the doorway 42 or traversed the hallway 34 across the doorway 42 at a slower pace than the individual that was detected as shown at 122. In other words, the output from the temperature sensor 26 allows for detecting the presence of an individual outside the doorway 42 and allows for determining whether that individual remains in the sensing field 44 for a particular amount of time. This is another example way in which the detected temperature information from one of the sensors of the system 20 provides information regarding activity within a monitored area.

A set of sensed temperatures including a cluster of data points at a larger peak 130 correspond to an individual crossing the threshold of the doorway 42 moving from the hallway 34 into the room 30. A slope of the detected temperatures at 132 shows an increase in the detected temperature over time, which corresponds to an individual moving closer toward the sensor 26. The slope of the line or curve corresponding to the data at 132 provides an indication of a direction of movement of the detected individual. The slope of the data also provides an indication of the speed or velocity of that individual. As shown at 134, the detected individual remains within the room 30 for approximately twenty seconds. That individual then exits the room 30 demonstrated by the decreasing temperatures shown at 136. The slope of the line or curve including the temperatures shown at 136 provides an indication of the speed with which the individual moves away from the sensor 26. The processor 32 determines the slope and provides an estimated speed in this example.

FIG. 6 illustrates how information from a temperature sensor and the other sensor 121 may be combined for providing additional or more accurate information. The sensor output 120 switches from the values shown in the lower portion of FIG. 6 to the values shown at 120' when the individual crosses the threshold of the doorway 42 and enters the room 30 sufficiently to activate the sensor 121. For example, the individual may turn on the lights when entering the room and the sensor 121 provides an indication of the lights being turned on at 120'. The output from the sensor 121 shown at 120' provides a confirmation that the individual has entered the room 30, which corresponds to the temperature indications provided as part of the peak 130.

In this example, a threshold temperature shown at 138 corresponds to an individual being at the threshold between the hallway 34 and the room 30. When the detected temperature is below the threshold 138, the individual is considered to be in the hallway 34. When the detected temperature is above the threshold 138, the individual is considered to be within the room 30. This demonstrates how the illustrated example allows for monitoring the location of a person between two adjacent areas that are both within the sensing field of a single temperature sensor.

FIG. 6 also demonstrates traffic through the hallway 34 shown by detected individuals or objects moving across the doorway 42 as shown at 140, 142 and 144.

The illustrated example allows for detecting the presence of an individual or object, determining whether that individual or object is stationary or moving, determining a direction of movement of that individual or object and determining a speed at which the individual or object is moving. The processor 32 is suitably programmed to make such determinations based upon the predetermined relationship between detected temperature and distance and changes in detected temperature over time, for example. Given this description, those skilled in the art will be able to develop appropriate programming for a processor to meet their particular needs.

Particular position information is available from the illustrated system 20. When more than one of the detectors 21-28 provides an indication of a detected individual or object, that temperature information provides an indication of a distance between each reporting sensor and the detected individual or object. That distance information and the known location of each reporting sensor allows for determining a particular location of that object or individual within the monitored area(s). In other words, the illustrated example uses temperature indications from the sensors 21-28 to provide location information that is more specific than simply providing an indication of presence within a room.

Figure 7:
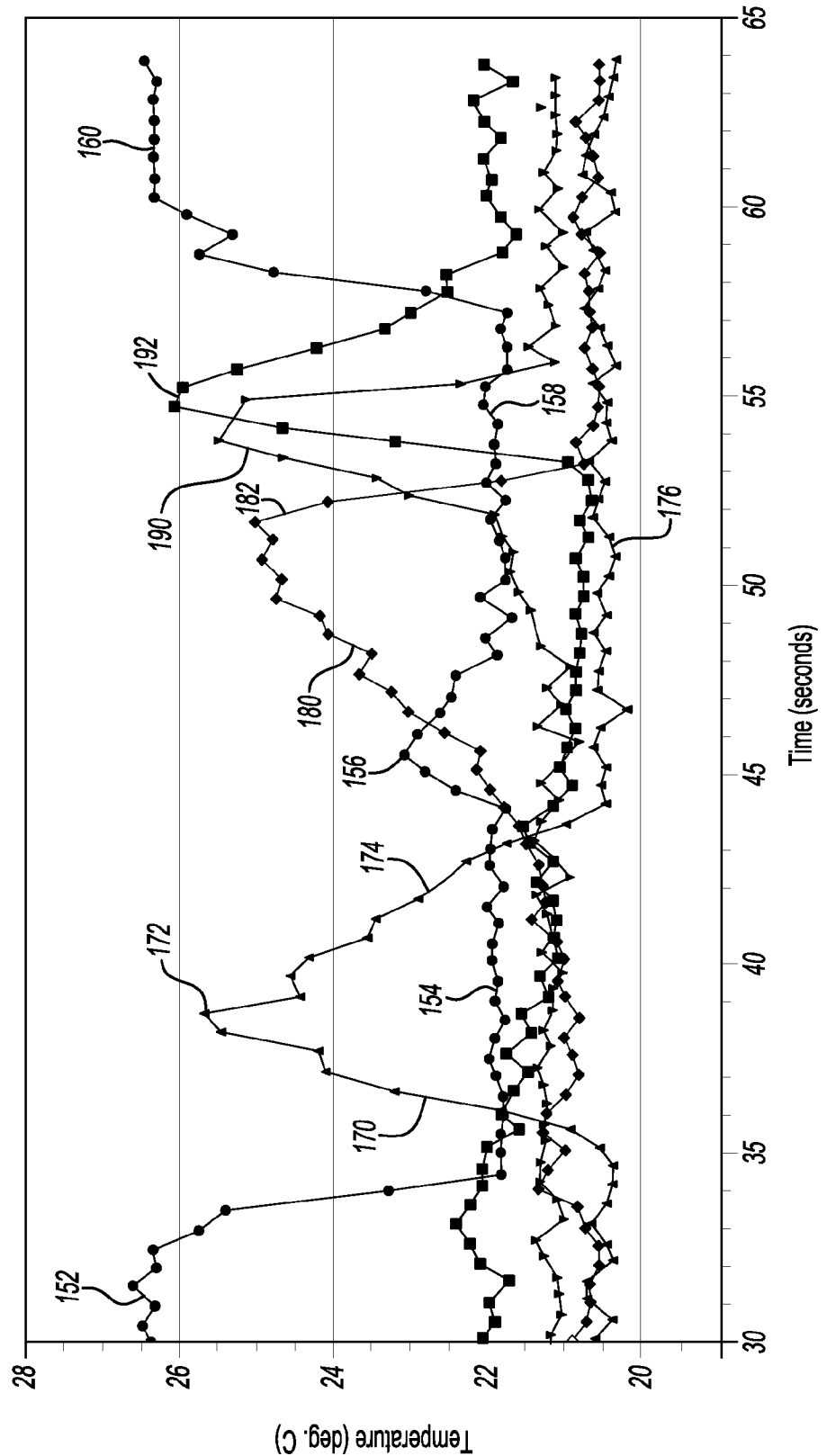
FIG. 7 illustrates example temperature sensor outputs during an example monitoring procedure.

The illustrated example also allows for monitoring the movement of an individual or tracking the position of an object or individual within a monitored area over time. FIG. 1 schematically shows a path 150 followed by the individual 36 within the room 30. FIG. 7 illustrates corresponding sensor outputs that provide an indication of the movement corresponding to the path schematically shown at 150. The output of the sensor 26 begins with the individual 36 at the position shown in FIG. 1. A sensed temperature at 152 indicates a relatively short distance between the sensor 26 and the individual 36. As the individual begins to walk to the left (according to the drawing), that individual eventually leaves the sensing field 44 and is not detected by the sensor 26. This is represented in FIG. 7 by the decrease in detected temperature as shown at 152 down to the lower detected temperature at 154, which corresponds to the ambient conditions within the room 30 because the individual 36 is no longer in the sensing field 44.

As shown at 156, while the individual is moving along the path 150, the individual will reenter the sensing field 44 as the individual 36 moves along the lower line of the path 150 moving from left-to-right (according to the drawing). That event is shown at 156 in FIG. 7. The detected temperature at 156 is lower than that shown at 152 because the individual is further from the sensor 26. The individual 36 then leaves the sensing field 44 again and the corresponding sensor output is shown at 158. Eventually the individual 36 returns to the starting point shown in FIG. 1 and this involves the individual 36 reentering the sensing field 44 relatively close to the sensor 26 resulting in an output increasing from the temperature shown at 158 to the detected temperature shown at 160.

While the output of the sensor 26 provides an indication of movement of the individual within the room 30, that taken alone does not necessarily provide a complete picture of the path 150 traveled by the individual 36. Outputs from the other sensors combined with the output from the sensor 26 provide the processor 32 with the ability to track the position of the individual 36 in an accurate manner.

The other sensors provide sensed temperature outputs based on their own ability to detect the individual 36 along the path 150 and this varies based on the placement of each sensor. While moving toward the left (according to the drawing), the individual 36 enters the sensing field of the detector 28 resulting in an increase in the detected temperature shown at 170. When the individual 36 reaches a closest point relative to the sensor 28, a peak temperature is detected at 172. As the individual 36 turns toward the left to move downward (according to the drawing) along the path 150, that individual moves away from the sensor 28 resulting in decreased detected temperatures as shown at 174. The slopes of the lines or curves including the detected temperatures shown at 170 and 174 provide information regarding the speed at which the individual 36 is moving, for example. Eventually, the individual 36 leaves the sensing field of the sensor 28 and the remaining output from that sensor is shown at 176, which corresponds to the ambient temperature detected by that sensor.

As the individual moves along the lowest portion of the path 150 moving from left-to-right (according to the drawing), the individual 36 is approaching the sensor 21. The output of that sensor is shown at 180 while the individual 36 moves closer to that sensor. Eventually, the individual 36 turns to the left and moves upward (according to the drawings) along the path 150. Upon leaving the sensing field of the sensor 21, the detected temperature drops as shown at 182 and the individual 36 remains outside the field of vision of the sensor 21.

The sensor output shown at 190 corresponds to the output from the sensor 24. As the individual 36 moves upward along the rightmost line of the path 150, eventually the individual 36 enters the sensing field of the sensor 24 resulting in the peak shown near 190. The output shown at 192 corresponds to an output from the sensor 22.

It can be appreciated from FIG. 7, for example, that the number of sensors and their distribution or density within an area of interest has an influence on the accuracy of the location information that can be determined from the detected temperature(s). Including more sensors in general provides more data for location purposes.

Additionally, some examples include sensors facing opposite each other for increased accuracy. When two sensors are positioned generally opposite each other, and individual that is relatively far from one likely will be relatively close to the other. Having at least one sensor close to an individual avoids inaccuracies that otherwise may occur because sensor accuracy tends to decrease as distance from a detected individual increases.

Another factor that influences the number of sensors that will provide desired accuracy is the angle of the field of view or sensing field of the sensors. Narrower sensing fields will generally require more sensors to provide coverage over a given area compared to the number of sensors required if they have wider sensing fields. Given this description and the particular sensors selected, those skilled in the art will be able to determine how many sensors to use and where to situate them to suit their particular needs.

As can be appreciated from the description of the illustrated example, the system 20 provides a range of position and tracking information that is superior to systems that are only able to indicate whether a detected object or individual is within a room, for example. The illustrated example utilizes detected temperature information and a predetermined relationship between that and distance from a sensor for directly determining position or movement information in a manner that allows for using relatively less expensive components and less complicated processing algorithms compared to previously proposed systems. The illustrated example allows for accurately monitoring the location of an individual or object based upon information from temperature sensors.

The preceding description sometimes refers to a detected or monitored object and at other times refers to an individual. Those terms are to be understood as being interchangeable as the context allows so that any discussion of determining the location of an individual pertains equally to determining the location of an object. The reverse is also true.

The various features of the disclosed system 20 are discussed with regard to different figures but the description is not to be considered in a limiting sense in that regard. Some embodiments will include more than one of the features illustrated in more than one of the figures while other embodiments may include less than all the features of one of the figures. Those skilled in the art who have the benefit of this description will realize which selection or combination of the disclosed figures will meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of determining location information, comprising the steps of:
   sensing a temperature of an object or person in a sensing field of at least one temperature sensor at each of a plurality of measurement periods;
   determining a relationship between the sensed temperature at a first one of the measurement periods and the sensed temperature at a second, later one of the measurement periods; and
   determining, from the determined relationship, whether the object or person moved relative to the temperature sensor during a time from the first one of the measurement periods to the second one of the measurement periods.

2. The method of claim 1, comprising
   determining that the object or person moved closer to the temperature sensor during the time if the sensed temperature at the first one of the measurement periods is less than the sensed temperature at the second one of the measurement periods;
   determining that the object or person moved further from the temperature sensor during the time if the sensed temperature at the first one of the measurement periods is higher than the sensed temperature at the second one of the measurement periods; and
   determining that the object or person was relatively stationary relative to the temperature sensor during the time if the sensed temperature at the first one of the measurement periods is approximately equal to the sensed temperature at the second one of the measurement periods.

3. The method of claim 1, comprising determining a distance between the temperature sensor and the object or person from the sensed temperature.

4. The method of claim 3, comprising determining the distance from a predetermined relationship between a sensor output that corresponds to a sensed temperature and distance from the sensor, wherein the predetermined relationship is based on a plurality of predetermined known distances and a corresponding plurality of sensor outputs and wherein the predetermined relationship is defined by a fitting function that includes the plurality of outputs.

5. The method of claim 4, wherein the object or person may have at least two orientations relative to the temperature sensor, each of the orientations has an effect on the temperature sensed by the temperature sensor and the method comprises
   determining a first relationship between the sensor output and distance corresponding to a first one of the orientations of the object or person;
   determining a second relationship between the sensor output and distance corresponding to a second one of the orientations of the object or person;
   determining a range of distances between the relationships for a sensed temperature; and
   determining the distance within an accuracy within the determined range.

6. The method of claim 3, comprising
   sensing a temperature of the object or person by each of a plurality of temperature sensors at known locations, respectively;
   determining a distance between each of the temperature sensors and the object or person; and
   determining a position of the object or person from the determined distances and the known locations.

7. The method of claim 6, comprising
   tracking movement of the object or person by repeatedly determining the position of the object or person over time.

8. The method of claim 1, wherein the sensing field includes at least two areas of interest and wherein the method comprises
   determining which of the areas of interest that the object or person is in during one of the measurement periods based on whether the sensed temperature is greater or less than a predetermined threshold temperature wherein the threshold temperature corresponds to the object or person being in a position at a border between the two areas of interest.

9. The method of claim 1, comprising determining a velocity of movement of the object or person relative to the sensor based on a difference between the sensed temperature from the first one of the measurement periods and the sensed temperature from the second one of the measurement periods.

10. The method of claim 1, comprising
sensing a second condition in a vicinity of the sensing field of the temperature sensor, the second condition being different than temperature; and
using the sensed second condition for confirming a condition determined based on the sensed temperature.

11. A system for determining location information of an object or a person, comprising:
at least one temperature sensor situated to sense a temperature of the object or the person in a sensing field of the sensor, the sensor providing an indication of a sensed temperature at each of a plurality of measurement periods; and
a processor configured to
receive sensed temperature indications from the temperature sensor,
determine a relationship between the sensed temperature at a first one of the measurement periods and the sensed temperature at a second, later one of the measurement periods, and
determine, from the determined relationship, whether the object or person moved relative to the temperature sensor during a time from the first one of the measurement periods to the second one of the measurement periods.

12. The system of claim 11, wherein the processor is configured to
determine that the object or person moved closer to the temperature sensor during the time if the sensed temperature at the first one of the measurement periods is less than the sensed temperature at the second one of the measurement periods;
determine that the object or person moved further from the temperature sensor during the time if the sensed temperature at the first one of the measurement periods is higher than the sensed temperature at the second one of the measurement periods; and
determine that the object or person was relatively stationary relative to the temperature sensor during the time if the sensed temperature at the first one of the measurement periods is approximately equal to the sensed temperature at the second one of the measurement periods.

13. The system of claim 11, wherein the processor is configured to determine a distance between the temperature sensor and the object or person from the sensed temperature.

14. The system of claim 13, wherein the processor is configured to determine the distance from a predetermined relationship between a sensor output that corresponds to a sensed temperature and distance from the sensor, wherein the predetermined relationship is based on a plurality of predetermined known distances and a corresponding plurality of sensor outputs and wherein the predetermined relationship is defined by a fitting function that includes the plurality of outputs.

15. The system of claim 14, wherein
the object or person may have at least two orientations relative to the temperature sensor, each of the orientations having an effect on the temperature sensed by the temperature sensor;
a first predetermined relationship between the sensor output and distance corresponds to a first one of the orientations of the object or person;
a second predetermined relationship between the sensor output and distance corresponds to a second one of the orientations of the object or person;
the processor is configured to determine a range of distances between the relationships for a sensed temperature; and
the processor is configured to determine the distance within an accuracy within the determined range.

16. The system of claim 13, comprising
a plurality of temperature sensors at known locations, respectively;
and wherein the processor is configured to
determine a distance between each of the temperature sensors and the object or person; and
determine a position of the object or person from the determined distances and the known locations.

17. The system of claim 16, wherein the processor is configured to track movement of the object or person by repeatedly determining the position of the object or person over time.

18. The system of claim 11, wherein the sensing field includes at least two areas of interest and wherein the processor is configured to
determining which of the areas of interest that the object or person is in during one of the measurement periods based on whether the sensed temperature is greater or less than a predetermined threshold temperature wherein the threshold temperature corresponds to the object or person being in a position at a border between the two areas of interest.

19. The system of claim 11, wherein the processor is configured to determine a velocity of movement of the object or person relative to the sensor based on a difference between the sensed temperature from the first one of the measurement periods and the sensed temperature from the second one of the measurement periods.

20. The system of claim 11, comprising a second sensor that senses a second condition in a vicinity of the sensing field of the temperature sensor, the second condition being different than temperature;
and wherein
the processor is configured to use the sensed second condition for confirming a condition determined based on the sensed temperature.

* * * * *